US009094327B2

(12) United States Patent
Jacobs et al.

(10) Patent No.: US 9,094,327 B2
(45) Date of Patent: *Jul. 28, 2015

(54) PRIORITIZATION AND PREEMPTION OF DATA FRAMES OVER A SWITCHING FABRIC

(71) Applicant: Cisco Technology, Inc., San Jose, CA (US)

(72) Inventors: Mick R. Jacobs, Auburn, CA (US); Michael A. Benning, Roseville, CA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/729,867

(22) Filed: Dec. 28, 2012

(65) Prior Publication Data

US 2013/0182704 A1 Jul. 18, 2013

Related U.S. Application Data

(63) Continuation of application No. 12/330,117, filed on Dec. 8, 2008, now Pat. No. 8,379,524.

(51) Int. Cl.
*H04L 12/28* (2006.01)
*H04L 12/50* (2006.01)
*H04B 7/212* (2006.01)
*H04L 12/947* (2013.01)
*H04L 12/851* (2013.01)
*H04L 12/933* (2013.01)
*H04L 12/931* (2013.01)
*H04L 12/937* (2013.01)
*H04L 12/935* (2013.01)

(52) U.S. Cl.
CPC .............. *H04L 49/25* (2013.01); *H04L 47/245* (2013.01); *H04L 47/2441* (2013.01); *H04L 49/15* (2013.01); *H04L 49/101* (2013.01); *H04L 49/201* (2013.01); *H04L 49/205* (2013.01); *H04L 49/254* (2013.01); *H04L 49/3018* (2013.01)

(58) Field of Classification Search
CPC .......... H04L 12/56; H04L 12/28; H04L 12/66
USPC .................... 370/357, 352, 356, 419, 463
See application file for complete search history.

(56) References Cited

U.S. PATENT DOCUMENTS

| 705,110 | A | | 7/1902 | Moritz et al. ................. 165/102 |
|---|---|---|---|---|
| 3,775,566 | A | | 11/1973 | Akimaru et al. ................ 179/18 |
| 5,163,046 | A | | 11/1992 | Hahne et al. .................. 370/237 |
| 5,179,552 | A | | 1/1993 | Chao ............................... 370/60 |
| 5,197,064 | A | | 3/1993 | Chao ............................... 370/60 |
| 5,197,127 | A | | 3/1993 | Waclawsky et al. .......... 709/224 |
| 5,343,473 | A | * | 8/1994 | Cidon et al. .................. 370/465 |
| 5,361,255 | A | | 11/1994 | Diaz et al. .................... 370/58.1 |
| 5,497,371 | A | * | 3/1996 | Ellis et al. ..................... 370/412 |

(Continued)

*Primary Examiner* — Yemane Mesfin
*Assistant Examiner* — Abdelillah Elmejjarmi
(74) *Attorney, Agent, or Firm* — Campbell Stephenson LLP

(57) ABSTRACT

Network switching and/or routing devices can use multiple priority data streams and queues to support prioritized serial transmission of data from line cards (or the like) through a fabric switch to other line cards (or the like). Preemption logic is used to insert within a data stream commands indicating a switch from one priority level data to another. Delimiter commands and combination switch/delimiter commands can also be used. Multiple crossbars are implemented in the fabric switch to support the various data stream priority levels.

21 Claims, 5 Drawing Sheets

(56) References Cited

U.S. PATENT DOCUMENTS

| | | | |
|---|---|---|---|
| 5,539,747 A | 7/1996 | Ito et al. | 370/235 |
| 5,557,608 A * | 9/1996 | Calvignac et al. | 370/389 |
| 5,673,253 A | 9/1997 | Shaffer | 370/229 |
| 5,838,690 A | 11/1998 | Kano et al. | 370/468 |
| 6,046,983 A | 4/2000 | Hasegawa et al. | 370/236.1 |
| 6,091,729 A | 7/2000 | Dove | 370/395 |
| 6,094,692 A | 7/2000 | Kalkunte | 710/34 |
| 6,104,700 A * | 8/2000 | Haddock et al. | 370/235 |
| 6,118,761 A | 9/2000 | Kalkunte et al. | 370/229 |
| 6,122,251 A | 9/2000 | Shinohara | 370/231 |
| 6,138,189 A | 10/2000 | Kalkunte | 710/53 |
| 6,144,636 A | 11/2000 | Aimoto et al. | 370/229 |
| 6,147,997 A | 11/2000 | Holden et al. | 370/395.1 |
| 6,157,643 A | 12/2000 | Ma | 370/389 |
| 6,167,030 A | 12/2000 | Kikki et al. | 370/236 |
| 6,230,229 B1 | 5/2001 | Van Krevelen et al. | 710/317 |
| 6,252,848 B1 | 6/2001 | Skirmont | 370/229 |
| 50,913 A1 | 12/2001 | Chen et al. | 370/360 |
| 6,356,548 B1 | 3/2002 | Nellenbach et al. | 370/362 |
| 48,280 A1 | 4/2002 | Lee et al. | 370/468 |
| 6,445,707 B1 | 9/2002 | Iuoras et al. | 370/395.43 |
| 6,463,067 B1 * | 10/2002 | Hebb et al. | 370/413 |
| 176,357 A1 | 11/2002 | Lay | 370/229 |
| 6,487,211 B1 | 11/2002 | Yamaguchi | 370/412 |
| 188,648 A1 | 12/2002 | Aweya et al. | 709/102 |
| 16,686 A1 | 1/2003 | Wynne et al. | 370/412 |
| 6,515,963 B1 | 2/2003 | Bechtolsheim et al. | 370/229 |
| 174,701 A1 | 9/2003 | Angle | 370/390 |
| 6,636,949 B2 | 10/2003 | Barroso et al. | 711/141 |
| 6,687,254 B1 | 2/2004 | Ho et al. | 370/412 |
| 6,700,869 B1 | 3/2004 | Falco et al. | 370/230 |
| 6,715,007 B1 | 3/2004 | Williams et al. | 710/52 |
| 6,724,776 B1 | 4/2004 | Jeffries | 370/468 |
| H2103 H * | 5/2004 | Modiano | 370/230 |
| 85,967 A1 | 5/2004 | Boduch et al. | 370/395.42 |
| 6,732,209 B1 | 5/2004 | Cherukuri et al. | 710/240 |
| 6,735,219 B1 * | 5/2004 | Clauberg | 370/474 |
| 6,781,971 B1 * | 8/2004 | Davis et al. | 370/329 |
| 6,839,768 B2 | 1/2005 | Ma et al. | 709/235 |
| 6,870,854 B1 | 3/2005 | Aimoto et al. | 370/412 |
| 6,907,001 B1 | 6/2005 | Nakayama et al. | 370/230 |
| 163,139 A1 | 7/2005 | Robotham et al. | 370/412 |
| 6,937,568 B1 | 8/2005 | Nicholl et al. | 370/236 |
| 226,149 A1 | 10/2005 | Jacobson et al. | 370/229 |
| 6,990,073 B1 | 1/2006 | Sandoval | 370/232 |
| 7,051,110 B2 | 5/2006 | Hagai et al. | 709/231 |
| 7,068,602 B2 | 6/2006 | Davari et al. | 370/232 |
| 7,072,299 B2 | 7/2006 | Bass et al. | 370/235 |
| 7,102,999 B1 | 9/2006 | Sindhu et al. | 370/235 |
| 233,102 A1 | 10/2006 | Kusumoto | 370/29 |
| 7,145,904 B2 | 12/2006 | Zhao et al. | 370/371 |
| H2203 H * | 10/2007 | Borchardt et al. | D8/396 |
| 7,298,703 B1 | 11/2007 | Rose et al. | 370/236 |
| 226,373 A1 | 9/2010 | Shimonishi | 370/392 |
| 2001/0030974 A1 * | 10/2001 | Pauwels | 370/444 |
| 2002/0057712 A1 * | 5/2002 | Moriwaki et al. | 370/463 |
| 2003/0007452 A1 | 1/2003 | Gorti et al. | 370/229 |
| 2003/0035373 A1 | 2/2003 | Bass et al. | 370/230.1 |
| 2003/0128703 A1 | 7/2003 | Zhao et al. | 370/392 |
| 2003/0165150 A1 | 9/2003 | Zimmermann et al. | 370/412 |
| 2003/0231593 A1 | 12/2003 | Bauman et al. | 370/235 |
| 2004/0004961 A1 | 1/2004 | Lakshmanamurthy et al. | 370/364 |

* cited by examiner

PRIORITIZATION AND PREEMPTION OF DATA FRAMES OVER A SWITCHING FABRIC

CROSS-REFERENCE TO RELATED APPLICATIONS

This application is a continuation of U.S. patent application Ser. No. 12/330,117, entitled "Prioritization and Preemption of Data Frames Over a Switching Fabric," filed Dec. 8, 2008, naming Mick R. Jacobs and Michael A. Benning as inventors; which is a divisional of U.S. patent application Ser. No. 10/288,937, entitled "Prioritization and Preemption of Data Frames Over a Switching Fabric," filed Nov. 6, 2002, now U.S. Pat. No. 7,464,180, naming Mick R. Jacobs and Michael A. Benning as inventors; which is a continuation-in-part of, and claims the benefit of priority based on, U.S. patent application Ser. No. 09/978,475, entitled "Adaptive Bandwidth Utilization Over Fabric Links," filed Oct. 16, 2001, now U.S. Pat. No. 8,145,787, and naming Kenneth Rose, Mick Jacobs, and Jatin Batra as inventors (the "'475 application"). The above-referenced applications are hereby incorporated by reference herein in their entirety.

FIELD OF THE INVENTION

The present invention relates to communications devices, data frame transfer over switching fabrics.

BACKGROUND OF THE INVENTION

In a communications network, switching devices ("switches") receive data at one of a set of input interfaces and forward the data on to one or more of a set of output interfaces. Users typically require that such switching devices operate as quickly as possible in order to maintain a high data rate. Switches are typically data link layer devices that enable multiple physical network (e.g., local area network (LAN) or wide area network (WAN)) segments to be interconnected into a single larger network. Switches forward and flood data traffic based on, for example, MAC addresses. In the most general sense, these types of networks transport data in the form of frames. A frame is a logical grouping of information sent as a data link layer unit over a transmission medium. Frames typically include header and/or trailer information, used for synchronization and error control, that surrounds user data contained in the unit. The terms cell, datagram, message, packet and segment are also used to describe logical information groupings at various layers of the OSI reference model and in various technology circles. As used herein, the term "frame" should be understood in its broadest sense, and can encompass other terms such as cell, datagram, message, packet and segment.

FIG. 1 illustrates a simplified block diagram of a switching network 100, such as a LAN switching network. In this example, the switch includes switching fabric 110 and multiple line cards 120 and 130. The switch thus connects various network devices 122, 124, 132, and 134 to each other through switching fabric 110 via line cards 120 and 130. Network devices 122, 124, 132, and 134 can, in general, include a variety of different devices including computer systems, output devices, storage devices, communications devices, or other network components such as routers, other switches, and even other networks.

It will be noted that the variable identifier "N" is used in FIG. 1 to more simply designate the final element (e.g., line card N 130) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Switching network 100 can employ one or more of a variety of different communication protocols enabling data communication between network devices. Line cards 120 and 130 generally take the form of an I/O interface card that typically performs data frame analysis as part of the switching process. Switching fabric 110 can also be implemented in a variety of ways. Three common types of switching fabrics are single-bus architectures, shared-memory architectures, and crossbars. Single-bus switching fabric architectures use a central fabric element within the switch to which all the ports of the switch communicate. Each port arbitrates for access to this fabric because there is one central switching element. With shared-memory architectures, a shared memory stores data frames and a high-speed ASIC reads and writes to the memory. Frames come into the architecture, a switching core places them in memory and then queues them to their outbound port. Buffering is internal to the switching fabric in this architecture, and buffers may be either fixed or dynamic. Crossbars use a mesh within the switching fabric to connect all the ports or all the line cards at high speed. Crossbars can be highly efficient for "balanced traffic," e.g., if port 1 and port 2 are communicating, and port 3 and port 4 are communicating then the crossbar directs those transmissions onto different paths.

One of the key benefits of crossbars is the ability to scale to significantly high bandwidth and throughputs. Consequently, crossbars are a popular type of switching fabric. But in addition to supporting high bandwidth and throughput, it is increasingly desirable that switches support network administrative features including access control, accounting, quality of service (QoS), and class of service (CoS) features. While it is well known for line cards to extract information, e.g. frame header information including destination and source addresses and packet priority, prior art switching fabrics, and particularly crossbars, do not support such features in a way that still affords the ability to scale throughput and bandwidth.

Accordingly, it is desirable to have data frame prioritization and preemption techniques, and switch fabrics in support thereof, to provide additional features for network switches while allowing such switches to provide high bandwidth and throughput.

SUMMARY OF THE INVENTION

It has been discovered that network switching and/or routing devices can use multiple priority data streams and queues to support prioritized serial transmission of data from line cards (or the like) through a fabric switch to other line cards (or the like). Preemption logic is used to insert within a data stream commands indicating a switch from one priority level data to another. Delimiter commands and combination switch/delimiter commands can also be used. Multiple crossbars are implemented in the fabric switch to support the various data stream priority levels.

Accordingly, one aspect of the present invention provides an apparatus including at least one input buffer, a first crossbar, a second crossbar, and at least one output buffer. The at least one input buffer is operable to receive data. The data includes data having a first priority level and data having a second priority level. The first crossbar is coupled to the at least one input buffer, and the first crossbar is operable to receive the data having a first priority level. The second crossbar is coupled to the at least one input buffer, and the second crossbar operable to receive the data having a second priority level. The at least one output buffer is coupled to the first crossbar and the second crossbar. The at least one output buffer is operable to receive the data having a first priority level from the first crossbar and the data having a second priority level from the second crossbar.

Another aspect of the present invention provides a method. A data stream is received. The data stream includes data having a first priority level and data having a second priority level. A priority level of data is detected from the data stream. Data having the first priority level is stored in a first input queue. Data having the second priority level is stored in a second input queue. Data having the first priority level is transmitted through a first crossbar coupled to the first input queue. Data having the second priority level is transmitted through a second crossbar coupled to the second input queue.

Yet another aspect of the present invention provides another apparatus including at least one input means, a first switching means, a second switching means, and at least one output means. The at least one input means is for receiving and storing data, wherein the data includes data having a first priority level and data having a second priority level. The first switching means is for transferring the data having a first priority level from the at least one input means, the first switching means being coupled to the at least one input means. The second switching means is for transferring the data having a second priority level from the at least one buffer means, the second switching means being coupled to the at least one input means. The at least one output means is for receiving and storing the data having a first priority level from the first switching means and the data having a second priority level from the second switching means. The at least one output means is coupled to the first and second switching means.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

In order to provide differing levels of quality of service, multiple data frame priorities are implemented. The examples described below focus on two priority levels, high and low, but those having ordinary skill in the art will readily recognize that the devices and techniques of the present application can be extended to more than two priority levels.

Figure 1:
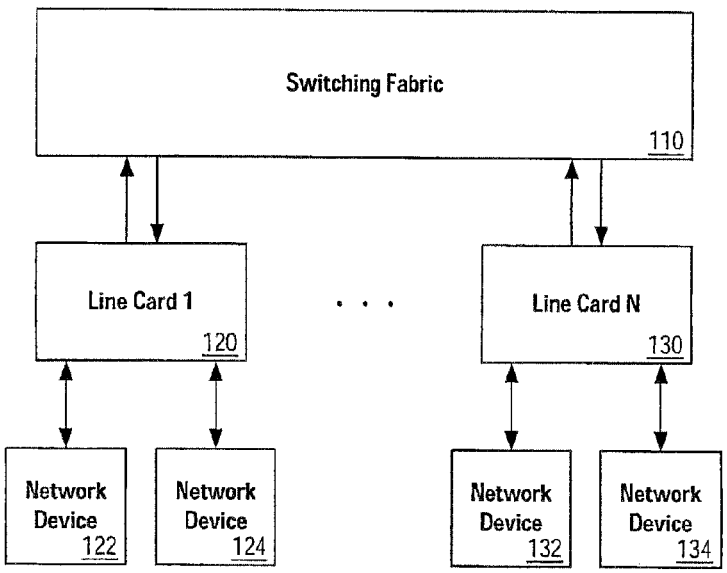
FIG. 1 illustrates a simplified block diagram of a switching network.
Figure 2A:
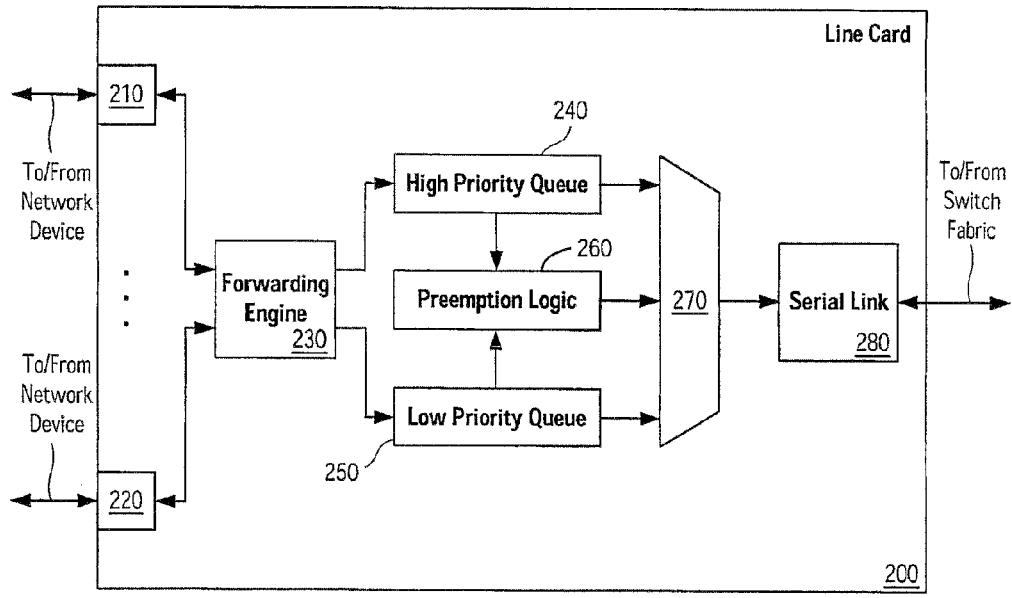
FIG. 2A illustrates a simplified block diagram of a line card supporting frame prioritization and preemption.

FIG. 2A illustrates a simplified block diagram of a line card supporting frame prioritization and preemption. It should be noted that for convenience, FIG. 2A illustrates the "ingress" or "uplink" data path and does not illustrate the data path from the switch fabric. Those having ordinary skill in the art will understand that typical line cards support data flow in both directions, i.e., to and from the switch fabric. Data frames arrive at line card 200 from various network devices via I/O ports such as ports 210 and 220. Forwarding engine 230 analyzes at least a portion of the frames to determine each frame's priority. For example, frames arriving from and/or destined for certain IP addresses may be assigned higher priority than those frames from/to other IP addresses. Thus, forwarding engine 230 can analyze a frame header to determine a corresponding IP address and thereby classify the frame as high or low priority. Once classified, a frame is forwarded to an appropriate queue, e.g., high priority queue 240 or low priority queue 250. Control signals from high priority queue 240 and low priority queue 250 notify preemption logic 260 that frames are present in the respective queues. In an alternative embodiment, preemption logic 260 can directly monitor or poll the queues to determine if frames are present.

Data from line card 200 is passed on to a switching fabric (e.g., switching fabric 110) after being serialized by serial link 280. Because data is serially transported from line card 200 to the switching fabric, both high and low priority traffic cannot be simultaneously transported. Serial transport across a backplane is typically used because of its speed and relatively small number of signal lines. Preemption logic 260 determines when to send a particular priority of data traffic, coordinates traffic transmission through multiplexer 270, and provides control information so that the switching fabric can process the traffic accordingly.

For example, if there are no high priority data frames in high priority queue 240, then preemption logic forwards data from low priority queue 250. When there is high priority data in queue 240, preemption logic 260 preempts the current stream of low priority data and transmits the high priority data. Because both low and high priority data is transmitted over the same serial link and it is most desirable to be able to arbitrarily preempt a low priority frame, i.e., preempt transmission at any point during the transmission of a frame, a delimiter is inserted into the data stream indicating the change from low priority data to high priority data.

Figure 2B:
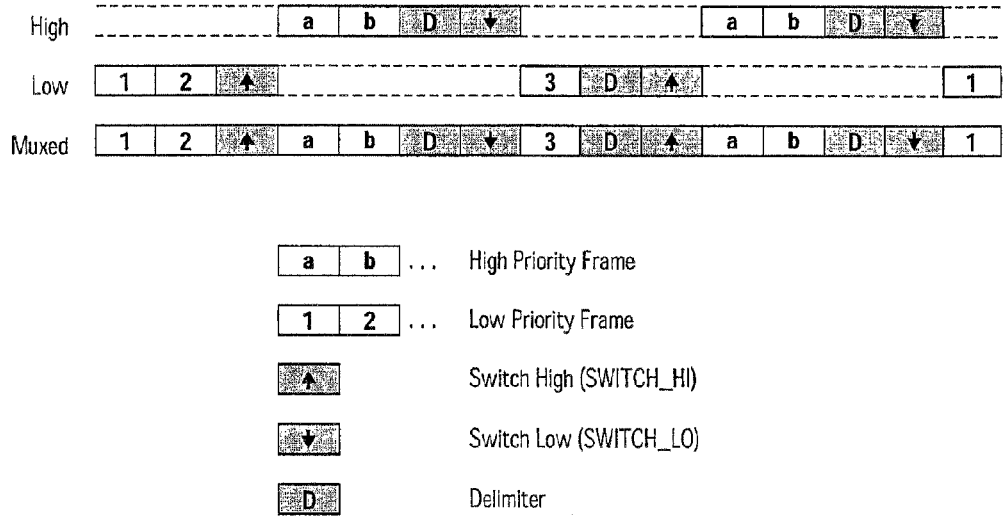
FIGS. 2B-2C illustrate prioritized data streams including switch codes and delimiters.
Figure 2C:
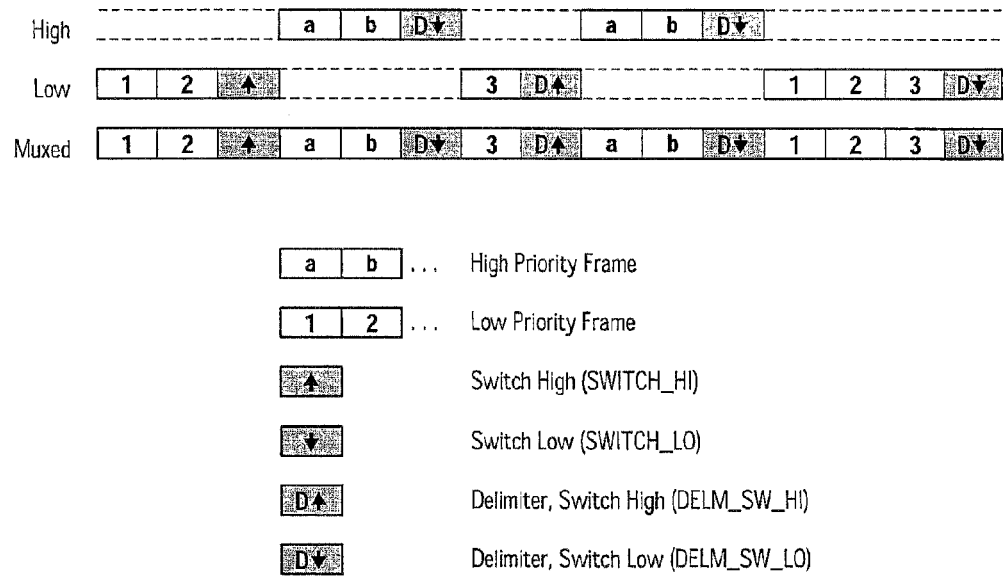

While prior transmission schemes might simply insert a delimiter between complete frames, regardless of priority, FIGS. 2B and 2C illustrate two techniques for multiplexing data of different priorities.

As illustrated in FIG. 2B, a delimiter code and two switch codes (SWITCH_HI and SWITCH_LO) can be used. The SWITCH_HI code informs the receiver that following data belongs to the high priority data stream. The SWITCH_LO code informs the receiver that following data belongs to the low priority data stream. The transmitter can generally switch between data streams at any time within frames or between frames. FIG. 2B shows two high priority frames and two low priority frames (one complete and one partial). The multiplexed (muxed) data stream begins with a low priority frame. Before the low priority frame is complete, the transmitter suspends the low priority frame by switching to the high priority data stream. The complete high priority frame is sent, the delimiter code marking the end of the high priority frame. A SWITCH_LO command follows indicating that transmission of the low priority data stream can proceed.

In the example of FIG. 2B, frame boundary delimiters are used in conjunction with switch commands. However, to reduce bandwidth requirements, delimiters can be combined with switch commands as shown in FIG. 2C. At the end of a complete frame where the priority level of the next frame will be different, a DELM_SW_HI or DELM_SW_LO code is added. The DELM_SW_HI code tells the receiver that high priority data follows. The DELM_SW_LO code tells the receiver that low priority data follows. These codes indicate to a receiver that the last portion of a frame (either preempted or not) has been transmitted. To further allow arbitrary multiplexing of high priority data and low priority data, switched data can also be marked with priority switch codes. For example, if, while a low priority frame is being transmitted to the switching fabric, preemption logic 260 determines or learns that a high priority frame is available and must be transmitted, the switching point of the paused low priority frame is marked with a SWITCH_HI code. The SWITCH_HI code tells the receiver that high priority data follows. But, unlike the DELM_SW_HI code, the SWITCH_HI code does not indicate that the preceding data was the end of a frame. Thus, a device receiving the SWITCH_HI code would know that a portion (e.g., the remainder) of the preempted low priority frame should be received at some point after the high priority transmission is complete. In a similar manner, a SWITCH_LO code tells the receiver that low priority data follows. In a further example, SWITCH_LO codes are not utilized because the system is designed to transmit complete high priority frames only, i.e., high priority frames are not preempted. In general, these codes are not part of the frame itself, but are separate data blocks or messages transmitted to the switching fabric.

Preemption logic 260 generates the appropriate codes and controls the flow of frames and control code insertion via multiplexer 270. As will be seen below, a similar scheme is used by the switching fabric to provide priority information to line cards that receive data transmissions from the fabric. Additionally, the control codes can be inserted into the "to-fabric" data stream using a variety of other techniques.

A further refinement of the present priority handling mechanism ensures that high priority data traffic does not preclude any low priority traffic from being transmitted. To guarantee a minimum level of service to low priority data, a number of different algorithms and techniques can be implemented. In one example, a leaky bucket mechanism is used. The leaky bucket mechanism includes a token buffer with a predetermined maximum buffer size. Tokens are generated at a specific rate depending upon the desired minimum level of service. A data frame (in this case a low priority data frame) cannot be transmitted to the fabric switch until the frame has secured a token from the token buffer. In the context of the above-described preemption mechanism, securing a token would also authorize a low priority frame to preempt a high priority frame. Such a technique can be implemented as part of preemption logic 260. A variety of other techniques can also be utilized to guarantee some level of service to low priority frames including: the use of a time-out feature forcing low priority frame transmission after a certain period elapses, the use of a high priority frame counter forcing low priority frame transmission after a certain number of high priority frames are transmitted with no intervening low priority transmission, and the like.

It should also be noted that line cards such as line card 200 generally include a variety of additional components in support of various frame processing and switching functions not described or illustrated in the present application.

Figure 3:
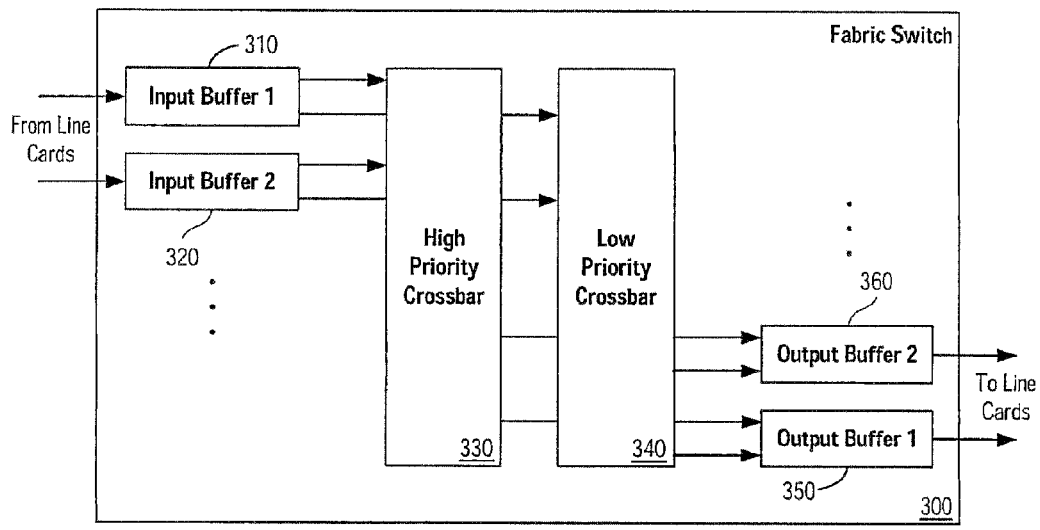
FIG. 3 illustrates a simplified block diagram of a fabric switch.

FIG. 3 illustrates a simplified block diagram of a fabric switch. Data frames from various line cards are forwarded to fabric switch 300 and received at input buffers 310 an 320. In general, there is an input buffer for each line card supported by fabric switch 300. Because fabric switch 300 is designed to support both high and low priority traffic, each input buffer separates high and low priority data frames from the serialized data stream received from the line cards. High priority data frames are forwarded to a high priority crossbar 330 for transmission to an appropriate output buffer, e.g. output buffers 350 and 360. As is the case with input buffers, there is typically one output buffer for each line card supported by fabric switch 300. Low priority data frames are also transmitted from input buffers 310 and 320 to a low priority crossbar 340 for transmission to an appropriate output buffer. Thus, fabric switch 300 switches high priority and low priority traffic separately. In doing so, the main advantages of crossbar architectures are retained while supporting different traffic priorities to allow varying levels of QoS.

In one embodiment, fabric switch 300 takes input frames from any port and stores them fully within that port's input buffer. From there, fabric switch 300 arbitrates for the output buffer(s) designated by embedded data fields within the received frames. For example, a port of exit (PoE) can be designated by one or more bits in the frame of data. The fabric switch transfers a frame to an output buffer corresponding to the port designated by the PoE bits. Multiple PoE bits can be asserted to send a frame to multiple destinations. After the arbitration is finished the data will flow from the input buffer memory to the output buffer memory. After frames are fully received within the output buffer, the frame can then be moved across the output port to the destination line card and on to a destination network device.

In some implementations, multiple fabric switches 300 are used so that a larger number of line cards and/or greater bandwidth can be supported. In such implementations, each of the fabric switches is synchronized so that data transfer across respective crossbars occurs approximately simultaneously. Synchronization and de-skew circuitry can be provided as separate circuits, e.g., not part of a fabric switch ASIC, between the line cards and the fabric switch, or such circuits can be provided as part of the fabric switch circuit itself. Additionally, one of the multiple fabric switches can be designated as a master while the others are slaves. In such an example, fabric switch header information, e.g., port of exit information, is always received by the master fabric switch.

The master fabric switch makes all decisions and communicates those decisions to the slave fabric switches via a synchronization bus.

In additional implementations, fabric switch block clearing mechanisms are designed to accommodate multiple priority levels. Block clearing mechanisms are utilized when, for example, output buffers cannot receive new frames or for some reason are not transmitting the frames that they currently hold. If a low priority frame is being blocked at an input buffer because the output buffer corresponding to the port for the frame's PoE has not acknowledged its request, the frame can still be transferred across crossbar 340 without waiting for the associated acknowledge(s) from the fabric output buffer(s). If a destination output port is not able to accept the frame, it will ignore the frame upon arrival (the typical case with a uni-destination frame). If the frame is a multi-destination frame, it is possible that most of the destination ports are not congested and can accept the frame with only those having fabric output buffers that are almost full (e.g., at or below a desired priority threshold) ignoring the frame. In contrast, high priority frames that are being blocked at the input buffer because the output buffer has not acknowledged a request will typically not be transmitted across crossbar 330 until an acknowledge signal is received. In this manner, greater care is taken to ensure that high priority traffic arrives at its destination.

Thus, in the event that a burst of traffic is too great for the combined fabric input and output buffering, the clear block mechanism causes the necessary discarding (of low priority packets) to occur at the fabric input buffers attempting to send to the congested fabric output buffer. Since there are two separate data paths for high and low priority packets, bursts of low priority congestion have little affect on the high priority throughput. Also the high priority traffic volume is assumed to be low enough to avoid congestion.

In still additional implementations, support exists for additional priority levels, e.g., medium priority. In such implementations, additional corresponding crossbars can be included. Alternately, line cards supporting additional priority levels that are not supported by the fabric switch can dequeue frames from its queues and map them into the two logical data streams supported by the fabric switch's buffers.

Figure 4:
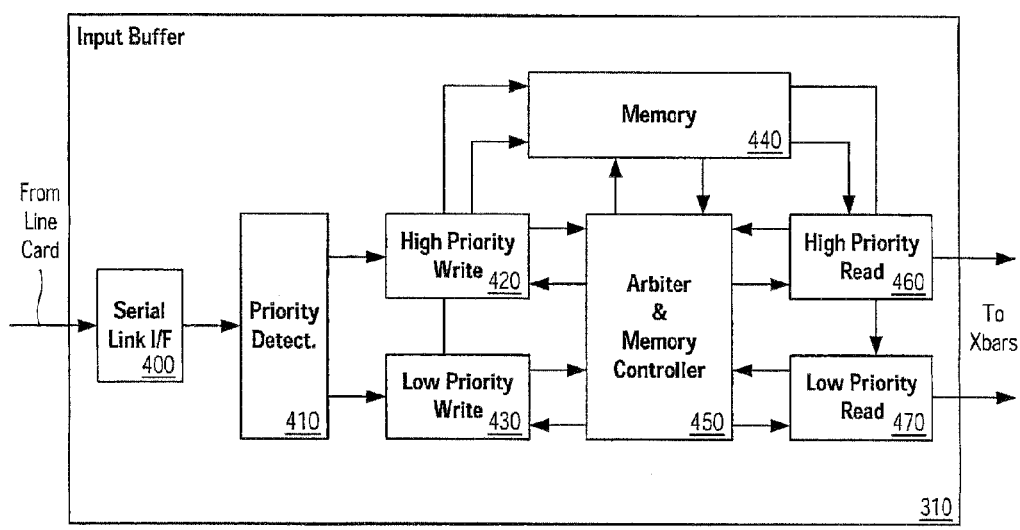
FIG. 4 illustrates a simplified block diagram of an input buffer of the fabric switch of FIG. 3.

FIG. 4 illustrates a simplified block diagram of one embodiment of input buffer 310. Input buffer 310 is used to store incoming frames sent by one or more line cards. Serialized data arrives from a line card and serial link interface 400. Serial link interface 400 is responsible for de-multiplexing and re-forming incoming data into frames or portions thereof. Priority detection circuit 410 separates high priority frames from low priority frames and forwards packets to the appropriate high priority or low priority queue. As illustrated in FIG. 4, the two frame queues are constructed from several different logic blocks. High priority write circuitry 420 and high priority read circuitry 460 operate in conjunction with memory 440 and arbiter and memory control 450 to provide a high priority frame queue. Similarly, low priority write circuitry 430 and low priority read circuitry 470 operate in conjunction with memory 440 and arbiter and memory control 450 to provide a low priority frame queue. With dual queues it is possible to maintain two independently controlled flows. Stopping one flow does not stop the other flow, and a multiplexing protocol allows either the low or high priority data stream to be stopped while allowing the opposite stream to continue.

Priority detection circuit 410 monitors the data stream for priority level control codes, e.g., the aforementioned SWITCH_HI, SWITCH_LO, DELM_SW_HI, and DELM_SW_LO codes, so as to separate the combined low and high priority streams into two distinct streams. Both control codes and data pass through unchanged to appropriate priority level receive state machines. In a typical implementation, priority detection circuit 410 only pays attention to the codes that switch between the two low and high priority streams. Whenever a stream-switching code is encountered Priority detection circuit 410 switches to the specified stream beginning with data following the stream switching code. As noted above, a switch can happen anywhere within a frame or between frames.

In the implementation illustrated in FIG. 4, data from the data stream is accumulated until one or more complete frames are received, at which time the appropriate write circuit (high priority write 420 or low priority write 430) writes the data to memory 440 in conjunction with arbiter and memory control circuit 450. Note that control codes are typically not accumulated and stored in respective queues. A variety of different queue structures can be implemented in support of the high priority and low priority queues. Some of those possible queue structures are described below in conjunction with FIG. 5. Many implementations of fabric switch 300 have a limited amount of memory dedicated for the input and output buffers for each port. To prevent these buffers from overflowing, flow control techniques are used to back pressure the incoming data. Examples of such flow control techniques can be found, for example, in the aforementioned '475 application.

Arbiter and memory control 450 receives high and low priority read and write requests from four inputs. In one implementation, write requests generally have priority over read requests, and high priority read requests and write requests have priority over low priority read requests and write requests respectively.

The presence of frames in the queues can be monitored by high priority read circuit 460 and low priority read circuit 470 in a number of ways. In one embodiment, separate counters track the number of frames in each queue. Arbiter & memory controller 450 and/or high priority read circuit 460 and low priority read circuit 470 monitor the counters. When either of the counters is non-zero, the appropriate read circuit sends some or all of the frames to its corresponding crossbar. As shown in FIG. 3, there are two paths along which data can be sent through fabric switch 300. One path and crossbar is for high priority data and one path and crossbar is for low priority data. Data can be sent along both paths simultaneously.

Figure 5:
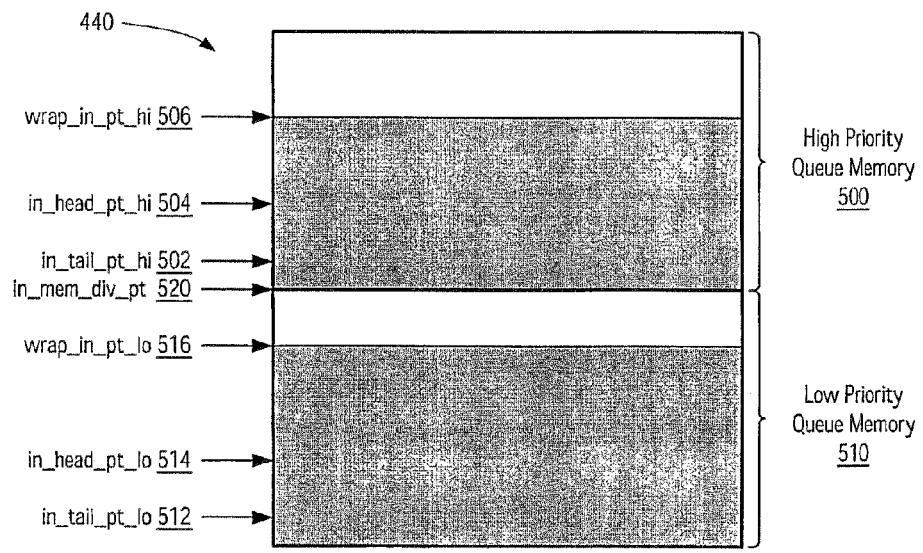
FIG. 5 illustrates an example of memory organization in support of the techniques of the present invention.

FIG. 5 illustrates an example of the organization of memory 440 to create both high and low priority queues. A single memory 400 is logically divided into two queues: high priority queue memory 500 and low priority queue memory 510. The boundary between the two queues is set by a pointer, in_mem_divider_pt 520. For each queue, two pointers describe boundaries of data currently stored in the queues. For high priority queue memory 500, the pointer in_tail_pt_hi 502 describes the location of the next data frame (or portion thereof) to be removed from the queue and the pointer in_head_pt_hi 504 describes the location where data is added to the queue. Similarly, for low priority queue memory 510, the pointer in_tail_pt_lo 512 describes the location of the next data frame (or portion thereof) to be removed from the queue and the pointer in_head_pt_lo 514 describes the location where data is added to the queue. The wrap_in_pt_lo and wrap_in_pt_hi pointers are used to set the wrap point for the each of the two input buffer queues. These wrap points represent the addresses where each of the input buffer queues end. When the address pointer of one of the input buffer queues reaches the wrap pointer, the next location will be the first location of the respective queue. This scheme implements the high and low priority queues as circular FIFO buffers. Moreover, by efficiently using a single memory, the overall memory requirements of fabric switch 300 can be reduced. Nevertheless, those having ordinary skill in the art will readily recognize that a variety of different buffering and memory organizing techniques can be used to implement the high and low priority queues.

Figure 6:
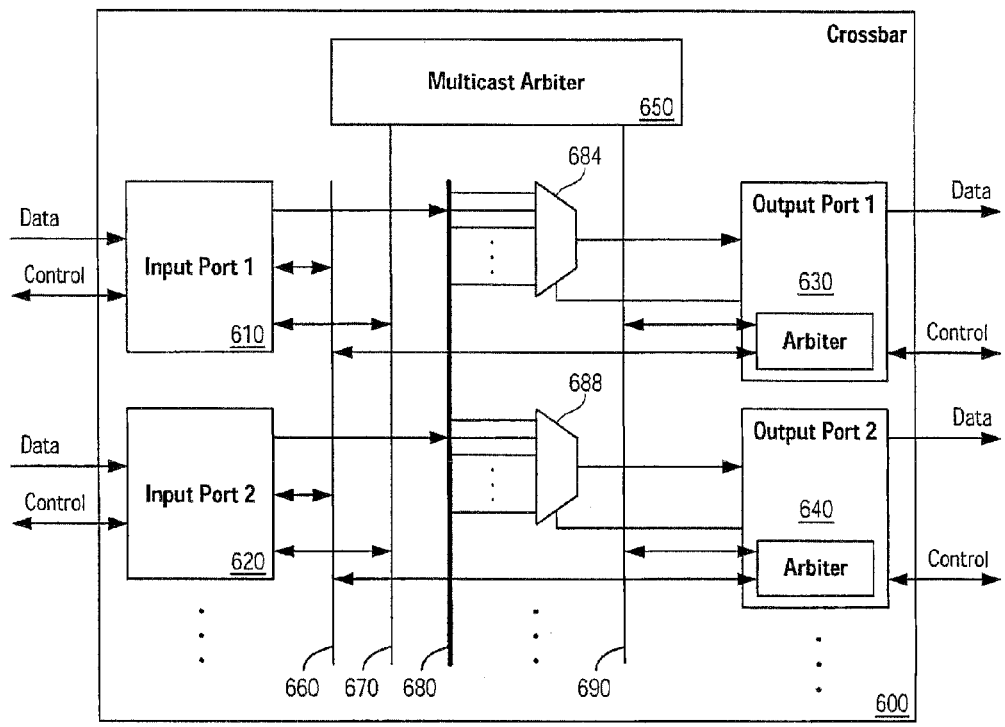
FIG. 6 illustrates a simplified block diagram of a crossbar.

Crossbar 600, e.g., a crossbar such as high priority crossbar 330 or low priority crossbar 340, is illustrated in FIG. 6. Each input port module (e.g., 610 and 620) receives frames (or portions thereof) from a switch fabric input buffer (e.g., 310 and 320). As noted above, the input buffers typically extract PoE information from frames and request frame transfer to the appropriate output port. Each output port module (e.g., 630 and 640) includes an arbiter circuit that controls access to that output port module. When an arbiter acknowledges a requested transfer, a corresponding input port module sends a frame into the crossbar. The output port module that acknowledged the transfer receives the frame and sends it on to an output buffer such as output buffer 350 or 360. Interconnection of input ports and output ports in crossbar 600 is achieved using data bus 680; arbitration buses 660, 670, and 690; and multiplexers such as multiplexers 684 and 688.

For frames destined for a single network location, i.e., unicast frames, an input port module makes arbitration requests directly to the arbiter of the destination output port via unicast arbitration bus 660. For frames having multiple network destinations, i.e., multicast frames, an input port module makes arbitration requests to a central multicast arbiter 650 via multicast arbitration bus 670. Multicast arbiter 650 arbitrates among all requesting input port modules and passes control signals (via multicast arbitration bus 690) to the appropriate output port module arbiters. In either case, the output port module(s) return the acknowledge signal(s) directly to the source input port modules.

As illustrated, crossbar 600 performs no priority based switching, that is the crossbar is generally unaware whether its traffic is high priority or low priority traffic. Thus, crossbars 330 and 340 of FIG. 3 can be implemented using two separate instances of the same crossbar circuit, e.g., crossbar 600. The only difference being the input buffer (and output buffer) queues to which the crossbars are connected.

Figure 7:
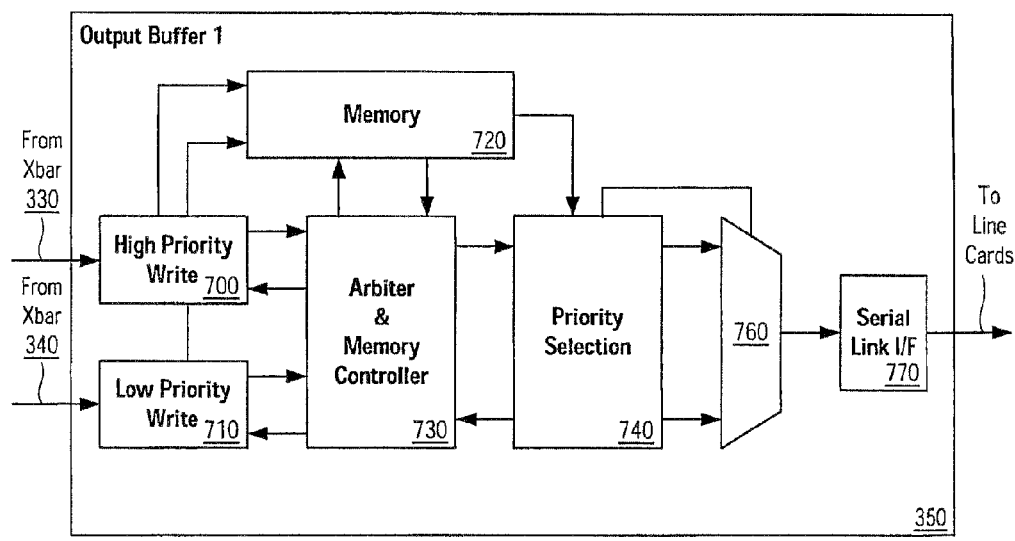
FIG. 7 illustrates a simplified block diagram of an output buffer of the fabric switch of FIG. 3.

The final step across switch fabric 300 is to one or more output buffer modules, such as modules 350 and 360. FIG. 7 illustrates a simplified block diagram of output buffer 350. Output buffers are used as multi-frame queues to store high and low priority data stream from corresponding crossbars before the frames are multiplexed in one data stream for transmission to a line card. As with the input buffers, each output buffer supports both low and high priority data to optimize output port low and high priority traffic flow. The low and high priority buffers can be accessed independently to enable the stopping of one flow without affecting the other flow. Output buffers will typically transfer all high priority frames first and then transfer any low priority frames.

Data destined to the output buffer queues arrives from the crossbars via low and high priority buses. Data from the two priority buses is accumulated to one or more memory words at which time the appropriate write circuit (high priority write 700 or low priority write 710) writes the data to memory 720 in conjunction with arbiter and memory controller 730. In one embodiment, the output buffer will drop all data sent to it if the data cannot be stored within memory 730. Data will only start being stored within memory 730 when the beginning of a frame has arrived and there is room in memory 730 for the transfer. If memory 730 runs out of room while receiving a frame, the transfer will be terminated and appropriate control bits set. This abnormally terminated frame will be sent to the line card, which will perform requisite verification, e.g., a CRC verification. In this example, the line card will determine that there is an error in the frame and the frame will be dropped.

A variety of different queue structures can be implemented in support of the high priority and low priority queues. As illustrated, memory 730 can be organized in much the same fashion as memory 440 described above and illustrated in FIG. 5.

Arbiter and memory controller 730 receives high and low priority read and write requests from four inputs. In one implementation, write requests generally have priority over read requests, and high priority read requests and write requests have priority over low priority read requests and write requests respectively.

The presence of frames in the queues can be monitored by priority selection circuit 740 and/or arbiter and memory controller 730 in a variety of ways. In general, priority selection circuit 740 includes functionality much like that of high priority read circuit 460 and low priority read circuit 470 as shown in FIG. 4. In one embodiment, separate counters track the number of frames in each queue. Arbiter & memory controller 730 and/or priority selection circuit 740 monitor the counters. When either of the counters is non-zero, the appropriate read circuit sends some or all of the frame to its corresponding line card. In an alternate embodiment, only a high priority queue frame counter is maintained. The single counter is monitored so that high priority frames are services first. When the counter is zero, low priority frames are processed. Since output buffer 350 transmits data to a line card, the data is serialized using serial link interface 770.

In order to retain priority information for each of the frames that is multiplexed onto a serial link between output buffer 350 and a line card, control codes similar to those discussed above in the context of FIG. 2 are utilized. Priority selection circuitry 740 determines when to send a particular priority of data traffic, coordinates traffic transmission through multiplexer 760, and provides control information so that a line card receiving the data stream can determine the priority level of the traffic being transmitted and process the traffic accordingly. For example, if there are no high priority data frames in the high priority queue, then priority selection logic 740 forwards data from the low priority queue. When there is high priority data, priority selection logic 740 preempts the current stream of low priority data and transmits the high priority data. Because both low and high priority data is transmitted over the same serial link and it is most desirable to be able to arbitrarily preempt a low priority frame, i.e., preempt transmission at any point during the transmission of a frame, a delimiter is inserted into the data stream indicating the change from low priority data to high priority data.

In one example, several different delimiters can be utilized. At the end of a complete frame where the priority level of the next frame will be different, a DELM_SW_HI or DELM_SW_LO code is added. The DELM_SW_HI code tells the receiver that high priority data follows. The DELM_SW_LO code tells the receiver that low priority data follows. These codes indicate to a receiver that the last portion of a frame (either preempted or not) has been transmitted. To further allow arbitrary multiplexing of high priority data and low priority data, switched data can also be marked with priority switch codes. If, while a low priority frame is being transmitted to the switching fabric, priority selection circuit 740 determines or learns that a high priority frame is available and must be transmitted, the switching point of the paused low priority frame is marked with a SWITCH_HI code. The SWITCH_HI code tells the receiver that high priority data follows. But, unlike the DELM_SW_HI code, the SWITCH_HI code does not indicate that the preceding data was the end of a frame. Thus, a device receiving the SWITCH_HI code would know that a portion (e.g., the remainder) of the preempted low priority frame should be received at some point after the high priority transmission is complete. In a similar manner, a SWITCH_LO code tells the receiver that low priority data follows. In a further example, SWITCH_LO codes are not utilized because the system is designed to transmit complete high priority frames only, i.e., high priority frames are not preempted. In general, these codes are not part of the frame itself, but are separate data blocks or messages transmitted from the switching fabric.

Priority selection circuit 740 generates the appropriate codes and controls the flow of frames and control code insertion via multiplexer 760. Additionally, the control codes can be inserted into the "to-line-card" data stream using a variety of other techniques. Also as noted above, various algorithms and techniques, i.e., a leaky bucket technique, can be used to guarantee that some amount of low priority traffic is transmitted.

The line cards and switching fabric described in this application can be used in a variety of devices including network switches, switch-routers, routers, router-switches and storage network devices.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
   receiving a first data stream, wherein
      the first data stream comprises data having a first priority level;
   receiving a second data stream, wherein
      the second data stream comprises data having a second priority level; and
   generating a combined data stream, wherein
      the generating is based on the first data stream and on the second data stream, and
      the combined data stream comprises
         portions of the first data stream,
         portions of the second data stream,
         one or more first delimiters, and
         one or more second delimiters, wherein
         each of the one or more first delimiters comprises a first switch code,
            wherein
            the first switch code indicates a change in priority from the first priority level to the second priority level,
         each of the one or more second delimiters comprises a second switch code, wherein
            the second switch code indicates a change in priority from the second priority level to the first priority level, and
         the portions of the first data stream and the portions of the second data stream are separated using the one or more first delimiters and the one or more second delimiters.

2. The method of claim 1, wherein
   the portions of the first data stream comprise a plurality of first data frames,
   the portions of the second data stream comprise a plurality of second data frames, and
   the generating the combined data stream comprises
      generating the plurality of first data frames, and
      generating the plurality of second data frames,
      in the combined data stream.

3. The method of claim 2, wherein
   the generating the combined data stream comprises
      determining whether a next second data frame of the plurality of second data frames is available for transmission, and
      in response to a determination that the next second data frame is available, pre-empting the generating of the plurality of first data frames in the combined data stream.

4. The method of claim 3, wherein
   the pre-empting the generating of the plurality of first data frames comprises
      inserting one of the one or more first delimiters in the combined data stream, and
      pausing the generating of the plurality of first data frames.

5. The method of claim 3, wherein
   the pre-empting is configured to be performed during generation of a first data frame of the plurality of first data frames, and
   the generating the combined data stream further comprises
      determining whether to resume the generation of the first data frame in the combined data stream,
      in response to a determination to resume the generation of the first data frame, inserting one of the one or more second delimiters into the combined data stream, and
      resuming the generation of the first data frame in the combined data stream.

6. The method of claim 2, wherein the generating the combined data stream further comprises
   determining whether a first data frame of the plurality of first data frames is available for transmission,
   in response to a determination that the first data frame is available, determining whether the first data frame is to be transmitted in the combined data stream, and
   in response to a determination that the first data frame is to be transmitted, inserting the first data frame in the combined data stream.

7. The method of claim 2, wherein
   at least one of the one or more first delimiters further indicates a next second data frame of the second data frames, and
   at least one of the one or more second delimiters further indicates a next first data frame of the first data frames.

8. The method of claim 1, wherein
   the combined data stream is configured to be received by an input module, and
   the input module is configured to
      process the combined data stream, and
      transmit data having the first priority level and data having the second priority level to the first and second switching devices, respectively, via first and second data paths, respectively.

9. An apparatus comprising:
   a line card comprising
   a forwarding module configured to
      receive a first data stream, wherein
         the first data stream comprises data having a first priority level, receive a second data stream, wherein
the second data stream comprises data having a second priority level; and
a multiplexer module configured to
receive the first data stream and the second data stream from the forwarding module, and
generate a combined data stream, wherein
the multiplexer module is configured to perform the generating based on the first data stream and on the second data stream, and
the combined data stream further comprises
portions of the first data stream,
portions of the second data stream,
the first delimiters, and
the second delimiters, wherein
each of the one or more first delimiters comprises a first switch code, wherein
the first switch code indicates a change in priority from the first priority level to the second priority level,
each of the one or more second delimiters comprises a second switch code, wherein
the second switch code indicates a change in priority from the second priority level to the first priority level, and
the portions of the first data stream and the portions of the second data stream are separated by the one or more first delimiters and the one or more second delimiters.

10. The apparatus of claim 9, wherein
the portions of the first data stream comprise a plurality of first data frames,
the portions of the second data stream comprise a plurality of second data frames, and
the generating the combined data stream comprises
generating the plurality of first data frames, and
generating the plurality of second data frames,
in the combined data stream.

11. The apparatus of claim 10, wherein
the multiplexer module is configured to generate the combined data stream by
determining whether a next second data frame of the plurality of second data frames is available for transmission, and
in response to a determination that the next second data frame is available, pre-empting the generating of the plurality of first data frames in the combined data stream.

12. The apparatus of claim 10, wherein
the multiplexer module is configured to pre-empt the generation of the first data frames by
inserting one of the one or more first delimiters in the combined data stream, and
pausing the generating of the plurality of first data frames.

13. The apparatus of claim 10, wherein
the pre-empting the generating of the plurality of first data frames in the combined data stream pre-empts generation of a first data frame of the first data frames, and
at least one of the one or more second delimiters indicates resuming generation of the first data frame.

14. The apparatus of claim 10, wherein
at least one of the one or more first delimiters further indicates a next second data frame of the second data frames, and
at least one of the one or more second delimiters further indicates a next first data frame of the first data frames.

15. The apparatus of claim 10, wherein
the combined data stream is configured to be received by an input module,
the input module is configured to
process the combined data stream, and
transmit data having the first priority level and data having the second priority level to the first and second switching devices, respectively, via first and second data paths, respectively.

16. An apparatus comprising
first receiving means for receiving a first data stream, wherein
the first data stream comprises data having a first priority level;
second receiving means for receiving a second data stream, wherein
the second data stream comprises data having a second priority level; and
generating means for generating a combined data stream, wherein
the generating is based on the first data stream and on the second data stream, and
the combined data stream comprises
portions of the first data stream,
portions of the second data stream,
one or more first delimiters, and
one or more second delimiters, wherein
each of the one or more first delimiters comprises a first switch code,
wherein
the first switch code indicates a change in priority from the first priority level to the second priority level,
each of the one or more second delimiters comprises a second switch code, wherein
the second switch code indicates a change in priority from the second priority level to the first priority level, and
the portions of the first data stream and the portions of the second data stream are separated by the one or more first delimiters and the one or more second delimiters.

17. The apparatus of claim 16, wherein
the portions of the first data stream comprise a plurality of first data frames,
the portions of the second data stream comprise a plurality of second data frames, and
the generating the combined data stream comprises
generating the plurality of first data frames, and
generating the plurality of second data frames,
in the combined data stream.

18. The apparatus of claim 16, wherein
the generating comprises
determining whether a next second data frame of the plurality of second data frames is available for transmission, and
in response to a determination that the next second data frame is available, pre-empting the generating of the plurality of first data frames in the combined data stream.

19. The apparatus of claim 16, wherein
at least one of the one or more first delimiters further indicates a next second data frame of the second data frames, and
at least one of the one or more second delimiters further indicates a next first data frame of the first data frames.

20. The apparatus of claim 16, wherein
the combined data stream is configured to be received by an input module,
the input module is configured to
  process the combined data stream, and
  transmit data having the first priority level and data having the second priority level to the first and second switching devices, respectively, via first and second data paths, respectively.

21. The method of claim 1, further comprising:
analyzing at least a portion of a frame of the first data stream; and
classifying a priority level of the first data stream in response to the analyzing.

* * * * *

UNITED STATES PATENT AND TRADEMARK OFFICE
CERTIFICATE OF CORRECTION

PATENT NO. : 9,094,327 B2
APPLICATION NO. : 13/729867
DATED : July 28, 2015
INVENTOR(S) : Mick R. Jacobs and Michael A. Benning It is certified that error appears in the above-identified patent and that said Letters Patent is hereby corrected as shown below:

In the Claims

Column 12
Line 59, in Claim 8, replace: "to the first" by -- to first --

Column 13,
Line 14, in Claim 9, replace: "the first delimiters" by -- one or more first delimiters --
Line 15, in Claim 9, replace: "the second delimiters" by -- one or more second delimiters --
Line 56, in Claim 13, replace: "claim 10" by -- claim 11 --

Column 14
Line 7, in Claim 15, replace: "to the first" by -- to first --
Line 53, in Claim 18, replace: "claim 16" by -- claim 17 --
Line 62, in Claim 19, replace: "claim 16" by -- claim 17 --
Line 64, in Claim 19, insert -- plurality of -- immediately after "frame of the"
Line 67, in Claim 19, insert -- plurality of -- immediately after "frame of the"

Column 15
Line 7, in Claim 20, replace: "to the first" by -- to first --

Signed and Sealed this
Nineteenth Day of April, 2016

Michelle K. Lee
*Director of the United States Patent and Trademark Office*